United States Patent Office 3,061,509
Patented Oct. 30, 1962

3,061,509
EMBALMING FLUID CONTAINING BLOOD PIGMENT AND METHOD OF MAKING
Edward H. Hart and Charles L. Tribby, Sandy Hook, and Hilary J. Morris, Stratford, Conn., assignors to Hartrimor Laboratories, Sandy Hook, Conn., a partnership
No Drawing. Filed Sept. 1, 1959, Ser. No. 837,334
3 Claims. (Cl. 167—49.5)

This invention relates to an embalming fluid containing blood pigment and method of making.

It is desirable in embalming and preparing a body for burial that it be given a color as nearly natural as possible, and difficulty has been experienced with present methods and materials in securing the desired and a uniform color. The results were spotty and non-uniform and unsatisfactory preservation and coloring were secured.

It is therefore an object of this invention to produce a coloring fluid which may be added to arterial embalming fluid to produce a natural and uniform color in the body.

It is also an object to produce a material of this character which is sufficiently stable to be readily preserved for appreciable periods of time, such, for example, as for at least a year or more at normal room temperatures.

With the foregoing and other objects in view we have devised the novel embalming fluid containing blood pigment, and the concentrate containing the blood pigment for adding to the embalming fluid and method of making it, as described in the following specification. It is, however, to be understood the invention is not limited to the specific details described, but may embody various changes and modifications within the scope of the invention.

Primarily the red cells (erythrocytes) of freshly drawn blood are separated from the other ingredients and the oxygen in these red cells replaced by CO, that is, the oxyhemoglobin is converted to carboxyhemoglobin, and this compound or blood pigment is stabilized with buffering materials so that it may be readily preserved for appreciable lengths of time. We stabilize the coloring matter (hemoglobin) in the blood after separation and add it to arterial embalming fluid to get natural color in the body. The hemoglobin is bonded into the solution by carboxylation, and the color is also improved. The protein and other ingredients are separated from the hemoglobin in the shells by centrifuge, and then the shells are exploded and separated from the hemoglobin, leaving pure hemoglobin or coloring matter which is added to the arterial embalming fluid. The hemoglobin is carboxylated either before or after exploding the shells.

In preparing this material freshly drawn blood, preferably human or bovine, is oxalated to prevent coagulation. This is preferably done with about 2 milligrams of potassium oxalate per milliliter and mixed well. This blood is then centrifuged at about 3600 r.p.m. for from five to ten minutes and the supernatant plasma decanted and discarded. An equal volume of approximately 0.9% sodium chloride solution is added to the remaining blood, mixed well, and centrifuged again at 3600 r.p.m. for five to ten minutes. The supernatant is decanted and discarded. This washing of the blood cells in the normal saline solution is preferably repeated twice, that is, they are washed in the saline solution in the centrifuge until the cells are packed to eliminate the white cells and all extraneous materials except the red cells. They are thus concentrated as a mass of pure red cells. As indicated, this washing is preferably done at least three times to secure the maximum concentration of red cells (erythrocytes).

There is added to the packed red cells sufficient ethyl ether to hemolyze them completely. The ethyl ether disrupts the cell cover or shell and the hemoglobin material is removed from the cell. The resultant fluid is centrifugated until all the cellular material or debris is removed with the sediment and discarded. The supernatant liquid contains the needed hemoglobin pigment. This liquid hemoglobin fraction is carboxylated by passing a stream of carbon monoxide gas through the mixture. Saturation is complete in a few minutes if it is kept agitated. The resultant liquid is carboxyhemoglobin derivative. It may be stored in a refrigerator and is stable at least for more than a year.

If preferred, the packed red cells (erythrocytes) may be treated with the carbon-monoxide gas before it is hemolyzed by the ethyl ether. Pure CO gas is passed in a stream through the red cell mass until the cells are saturated with the CO. This takes about five minutes if kept agitated. At the end of this time the red cells are hemolyzed by ethyl ether and the resultant fluid is centrifugated until all the cellular material is removed with the sediment and discarded, leaving the carboxyhemoglobin pigment.

The carboxyhemoglobin pigment is in liquid form and as it is used in this form no further processing for crystallization is required. However, it may be crystallized for prolonged storage if desired.

This material is used as a pigment in coloring the liquid injected into the arteries (embalming fluid). It is stabilized and preserved with suitable protecting and buffering materials.

The preferred basic formula for the concentrate to be used with the embalming fluid is as follows, with normal variations in percentages of ingredients permitted.

To make one pint of the basic unit of concentrate:

| Reagent | Units | Amount |
| --- | --- | --- |
| Formaldehyde | Milliliters | 132.5 |
| Glycerol | do | 23.7 |
| Buffer | do | 298.1 |
| Safranin | do | 4.7 |
| Eosin | do | 11.8 |
| Carboxyhemoglobin | do | 2.4 |
| Antifoam | do | 0.05 |

NOTES

1. Formaldehyde (HCHO)—40% aqueous solution (formalin), neutralized by excess of calcium carbonate—in form of marble chips. Volume 28% Formalin concentration.
2. Glycerol—reagent grade.
3. Buffer—pH 7.2—potassium di-hydrogen phosphate ($KH_2PO_4$) 2.6 grams. Di-sodium hydrogen phosphate ($Na_2HPO_4$) 6.7 grams. Water to make 1000 milliliters. (Analytical reagent grade anhydrous salts.)
4. Safranin—1% aqueous solution. Safranin O (water soluble) #350—Color Index #841. Total dye content 82%.
5. Eosin—1% aqueous solution. Eosin Y (water soluble) #516—Color Index 768. Total dye content 95%.
6. Antifoam. Defoaming agents, such, for example, as sulfonated oils; or silicones, preferably 10% solvent dispersion in ethyl ether, readily available on the market as Dow Corning "Antifoam A."
7. Water—ion exchange water, 2,000,000 ohms per milliliter.
8. Carboxyhemoglobin derivative.

The ingredients are mixed according to formula, allowed to stand for twenty-four hours and filtered.

Any mammalian blood can be used if concentration of hemoglobin is adequate or compensated for, but human or bovine blood is preferred.

This carboxyhemoglobin concentrate may be added to the embalming fluid at any time, either just before use or it may be stored after mixing. It may be added by the embalmer in amounts to suit his preference or to secure color desired. In use, after exsanguinating the body pre-injection fluid may be used to remove most of the remaining blood, and then the embalming fluid containing this concentrate is injected. It produces a much more natural and uniform coloring in the body than that secured by the old methods. It may be used with any of the known embalming fluids, including those in which formaldehyde is an important ingredient.

Having thus set forth the nature of our invention, we claim:

1. A stable carboxyhemoglobin derivative for use as a coloring agent, said derivative being prepared by oxalating freshly drawn blood; centrifuging said blood and decanting and discarding the supernatant plasma; mixing and washing the remaining blood with a normal sodium chloride solution; centrifuging the washed blood and decanting and discarding the supernatant; adding to the remaining red cells sufficient ethyl ether to completely hemolyze them; centrifuging the hemolyzed cells and removing the ruptured cellular debris; and carboxylating the remaining hemoglobin by passing carbon monoxide gas therethrough.

2. A method of purifying and stabilizing a carboxyhemoglobin derivative as a coloring blood pigment for arterial embalming fluid comprising the steps of oxalating freshly drawn blood, centrifuging this blood and decanting and discarding the supernatant plasma, mixing and washing the remaining blood with a normal sodium chloride solution, centrifuging again and decanting and discarding the supernatant, adding to the packed red cells (erythrocytes) sufficient ethyl ether to completely hemolyze them, centrifuging this material to remove the ruptured cellular debris, and carboxylating the hemoglobin in the supernatant liquid by passing a stream of carbon monoxide gas.

3. A method of purifying and stabilizing a carboxyhemoglobin derivative comprising the steps of oxalating freshly drawn blood by mixing with a solution of potassium oxalate, centrifuging this mixture and decanting and discarding the supernatant plasma, adding an equal volume of 0.9% sodium chloride solution to the remaining blood and mixing, again centrifuging and decanting the supernatant, adding to the packed red cells (erythrocytes) sufficient ethyl ether to hemolyze completely, centrifuging this material to remove all cellular debris of the exploded cells, and carboxylating the hemoglobin pigment by passing a stream of carbon monoxide gas through the supernatant liquid.

References Cited in the file of this patent

UNITED STATES PATENTS

| | | |
|---|---|---|
| 1,870,123 | Jones | Aug. 22, 1932 |
| 2,352,099 | Hobdell | June 20, 1944 |
| 2,521,108 | Williams | Sept. 8, 1950 |

OTHER REFERENCES

Wintrobe: Clinical Hematology, 2nd Ed., 1949, pp. 112, 123–126.